US012687687B2

(12) United States Patent
Zhao et al.

(10) Patent No.: US 12,687,687 B2
(45) Date of Patent: Jul. 21, 2026

(54) OVERHEAD RIBBON CABLE, MANUFACTURING METHOD AND MANUFACTURING SYSTEM FOR OVERHEAD RIBBON CABLE

(71) Applicant: JIANGSU ZHONGTIAN TECHNOLOGY CO., LTD., Nantong (CN)

(72) Inventors: Jing Zhao, Nantong (CN); Xiaoming Miao, Nantong (CN); Bin Miao, Nantong (CN); Menglong Yue, Nantong (CN); Huihui Qian, Nantong (CN); Feng Tan, Nantong (CN)

(73) Assignee: JIANGSU ZHONGTIAN TECHNOLOGY CO., LTD., Nantong (CN)

( * ) Notice: Subject to any disclaimer, the term of this patent is extended or adjusted under 35 U.S.C. 154(b) by 312 days.

(21) Appl. No.: 18/568,247

(22) PCT Filed: Dec. 14, 2021

(86) PCT No.: PCT/CN2021/138094
§ 371 (c)(1),
(2) Date: Dec. 7, 2023

(87) PCT Pub. No.: WO2022/262222
PCT Pub. Date: Dec. 22, 2022

(65) Prior Publication Data
US 2024/0280774 A1 Aug. 22, 2024

(30) Foreign Application Priority Data
Jun. 17, 2021 (CN) .......................... 202110675440.7

(51) Int. Cl.
*G02B 6/44* (2006.01)

(52) U.S. Cl.
CPC ......... *G02B 6/4404* (2013.01); *G02B 6/4423* (2013.01); *G02B 6/44384* (2023.05); *G02B 6/448* (2013.01); *G02B 6/4486* (2013.01)

(58) Field of Classification Search
CPC .............. G02B 6/4404; G02B 6/44384; G02B 6/4423; G02B 6/448; G02B 6/4486
See application file for complete search history.

(56) References Cited

U.S. PATENT DOCUMENTS 8,369,668 B1 * 2/2013 McNutt ................ G02B 6/4494
385/109
2008/0014501 A1 1/2008 Skotheim et al.
(Continued)

FOREIGN PATENT DOCUMENTS

CN 102540370 A 7/2012
CN 104143390 A 11/2014
(Continued)

OTHER PUBLICATIONS

The Second Office Action of the corresponding CA application No. 3,222,457 issued on Feb. 9, 2026.

*Primary Examiner* — Tina Wong
(74) *Attorney, Agent, or Firm* — The Sun IP Law

(57) ABSTRACT

Disclosed are an overhead ribbon cable, a manufacturing method, and a manufacturing system for the overhead ribbon cable. The overhead ribbon cable includes an optical fiber ribbon array (10). The optical fiber ribbon array (10) includes a plurality of optical fiber ribbons (11) arranged in an array. A surface of the optical fiber ribbon array (10) is wrapped sequentially with a water-blocking assembly and an outer protection layer (50). The water-blocking assembly includes a water-blocking sealing layer (20) formed by heating and curing a sealant. The water-blocking sealing layer (20) wraps the surface of the optical fiber ribbon array (10) in an axial direction of the optical fiber ribbon array (Continued)

(10) and fills a gap between two adjacent optical fiber ribbons (11). The overhead ribbon cable has improved splicing efficiency, and is clean and environmentally friendly.

16 Claims, 4 Drawing Sheets

(56) References Cited

U.S. PATENT DOCUMENTS

| | | | |
|---|---|---|---|
| 2008/0020582 A1 | 1/2008 | Bai | |
| 2008/0145010 A1* | 6/2008 | Overton | G02B 6/44384 |
| | | | 385/115 |
| 2008/0205828 A1* | 8/2008 | Cook | G02B 6/4404 |
| | | | 385/100 |
| 2019/0369351 A1* | 12/2019 | Benjamin | G02B 6/44384 |
| 2020/0008896 A1 | 1/2020 | Cone et al. | |
| 2020/0073068 A1* | 3/2020 | Shimizu | G02B 6/441 |
| 2021/0041655 A1 | 2/2021 | Sahoo et al. | |
| 2021/0048589 A1* | 2/2021 | Kumar | G02B 6/4411 |
| 2021/0271041 A1* | 9/2021 | Kumar | G02B 6/4431 |

FOREIGN PATENT DOCUMENTS

| | | | |
|---|---|---|---|
| CN | 104312065 A | 1/2015 | |
| CN | 105807381 A | 7/2016 | |
| CN | 206369841 U | 8/2017 | |
| CN | 107422438 A | 12/2017 | |
| CN | 111983761 A | 11/2020 | |
| CN | 211907067 U | 11/2020 | |
| CN | 113419319 A | 9/2021 | |
| JP | 2001506687 A | 5/2001 | |
| JP | 2001-343566 A | 12/2001 | |
| WO | 2020/106497 A1 | 5/2020 | |

* cited by examiner

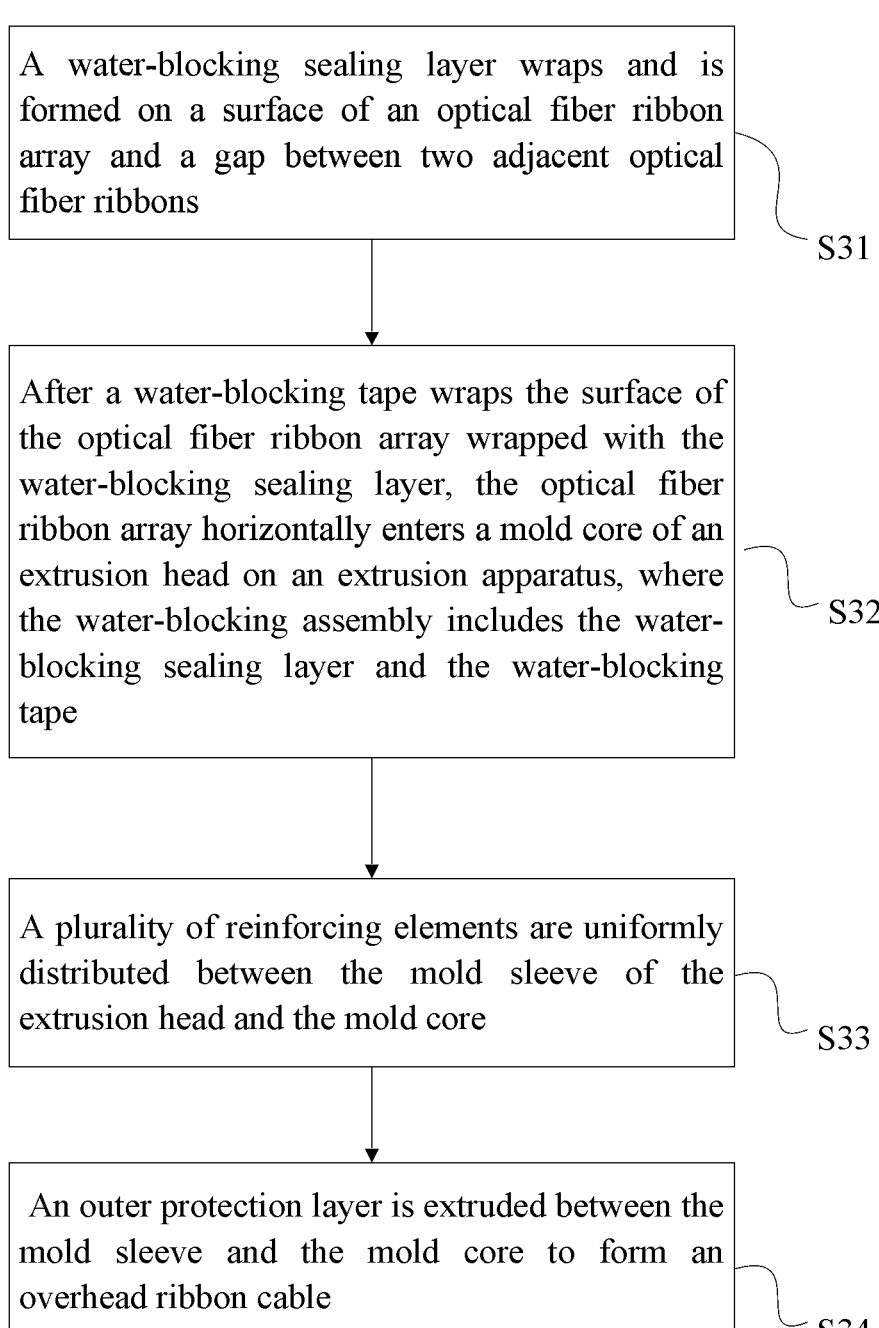

A water-blocking sealing layer wraps and is formed on a surface of an optical fiber ribbon array and a gap between two adjacent optical fiber ribbons ⟶ S31

After a water-blocking tape wraps the surface of the optical fiber ribbon array wrapped with the water-blocking sealing layer, the optical fiber ribbon array horizontally enters a mold core of an extrusion head on an extrusion apparatus, where the water-blocking assembly includes the water-blocking sealing layer and the water-blocking tape ⟶ S32

A plurality of reinforcing elements are uniformly distributed between the mold sleeve of the extrusion head and the mold core ⟶ S33

An outer protection layer is extruded between the mold sleeve and the mold core to form an overhead ribbon cable ⟶ S34

Fig. 4

An optical fiber ribbon array passes through a gluing apparatus, and the sealant wraps the surface of the optical fiber ribbon array and fills the gap between two adjacent optical fiber ribbons by the gluing apparatus

S311

The optical fiber ribbon array wrapped with the sealant passes through a heating apparatus, and the sealant is cured in the heating apparatus to form the water-blocking sealing layer

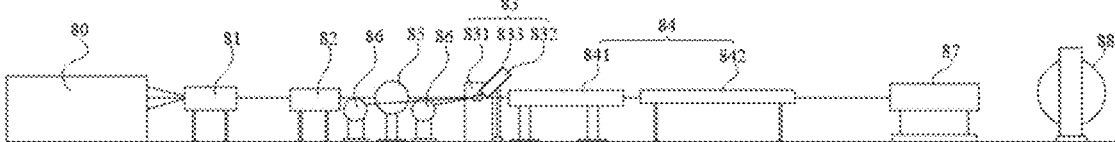

OVERHEAD RIBBON CABLE, MANUFACTURING METHOD AND MANUFACTURING SYSTEM FOR OVERHEAD RIBBON CABLE

CROSS-REFERENCE TO RELATED APPLICATION(S)

The present disclosure is a national stage application of International Patent Application No. PCT/CN2021/138094, which is filed on Dec. 14, 2021. The present disclosure claims priority to Patent Application No. 202110675440.7, filed to the China National Intellectual Property Administration on Jun. 17, 2021 and entitled "Overhead Ribbon Cable, Manufacturing Method and Manufacturing System for Overhead Ribbon Cable".

TECHNICAL FIELD

The disclosure relates to the technical field of communications, and in particular to an overhead ribbon cable, a manufacturing method and a manufacturing system for the overhead ribbon cable.

BACKGROUND

With the advancement of optical network construction, resources of urban pipelines are becoming increasingly scarce, and the cost of laying optical cables in the pipelines is also increasing. Therefore, overhead ribbon cables have experienced rapid development.

The overhead ribbon cables are mainly laid by using existing open wire poles, which may increase the convenience of construction, reduce the laying cost, and shorten the construction period to a certain extent. The overhead ribbon cables are widely used in small and medium-sized cities and rural areas. As the "last mile" access of a fiber-to-the-home network, when the overhead ribbon cable is introduced from outdoors to indoors, they must go through a switching process. At present, the structure of the overhead ribbon cables is compact, generally using a layer-stranded structure, with water-blocking gel filled in gaps inside a cable core.

However, when the optical cables are overhead into homes, considerable cost and time is required to clean the gel, which not only has low splicing efficiency and brings inconvenience to the construction, but also causes environmental pollution during optical fiber splicing.

SUMMARY

Some embodiments of the disclosure provide an overhead ribbon cable, a manufacturing method and a manufacturing system for the overhead ribbon cable, which may not only improve the splicing efficiency of the overhead ribbon cable, but also be clean and environmentally friendly.

A first aspect of the disclosure provides an overhead ribbon cable, which includes an optical fiber ribbon array. The optical fiber ribbon array includes a plurality of optical fiber ribbons arranged in an array. A surface of the optical fiber ribbon array is wrapped sequentially with a water-blocking assembly and an outer protection layer in an axial direction of the optical fiber ribbon array. The water-blocking assembly includes a water-blocking sealing layer formed by heating and curing a sealant. The water-blocking sealing layer wraps the surface of the optical fiber ribbon array in the axial direction of the optical fiber ribbon array and fills a gap between two adjacent optical fiber ribbons.

In some embodiments, the optical fiber ribbon array is formed by stacking the plurality of optical fiber ribbons in parallel with each other.

In some embodiments, each optical fiber ribbon includes a plurality of optical fibers and a connection layer. The plurality of optical fibers are linearly arranged, the connection layer is located between two adjacent optical fibers, the connection layer wraps a surface of the each optical fiber in an axial direction of the each optical fiber, and the connection layer, after photo-curing, forms the optical fiber ribbon together with the optical fibers.

In some embodiments, the connection layer has a viscosity of 3800 mPa·S to 4500 mPa·S at 25° C. and a density of 1.08 g/cm$^3$ to 1.15 g/cm$^3$ before curing, and the connection layer has an elastic modulus of 350 MPa to 650 MPa, an elongation at break of not less than 35%, and a tensile strength of not less than 15 MPa under preset conditions. The preset conditions are 2.5% elastic deformation and 23° C.

In some embodiments, the connection layer is formed by curing a photo-cured coating containing a resin. The resin is an acrylic resin.

In some embodiments, the optical fiber is a colored fiber.

In some embodiments, the water-blocking sealing layer is of an elastic structure formed after heating and curing the sealant.

In some embodiments, the sealant is a water swellable water-blocking filling adhesive.

In some embodiments, the water blocking assembly includes a water-blocking tape. The water-blocking tape fully wraps the surface of the optical fiber ribbon array in the axial direction of the optical fiber ribbon array, and the water-blocking sealing layer is located at a side, facing the optical fiber ribbon array, of the water-blocking tape.

In some embodiments, a surface, adjacent to the optical fiber ribbon array, of the water-blocking tape is a smooth surface, and a surface, adjacent to the outer protection layer, of the water-blocking tape is a rough surface.

In some embodiments, a plurality of reinforcing elements are further arranged in the outer protection layer, and the plurality of reinforcing elements are parallel in the axial direction of the optical fiber ribbon array and are symmetrically distributed in the outer protection layer.

In some embodiments, a surface of the outer protection layer is further provided with an identification line, a connection of the outer protection layer and the water-blocking assembly is further provided with a plurality of rip cords, the rip cords and the identification line are parallel to an axis of the optical fiber ribbon array, and the plurality of rip cords are uniformly distributed on a peripheral side of the optical fiber ribbon array.

A second aspect of the disclosure provides a manufacturing method for an overhead ribbon cable. The manufacturing method is applied to the above overhead ribbon cable. The manufacturing method includes the following operations:

a plurality of optical fibers are prepared into the optical fiber ribbons;

the optical fiber ribbons are prepared into the optical fiber ribbon array;

a surface of the optical fiber ribbon array is wrapped sequentially with the water-blocking assembly and the outer protection layer in an axial direction of the optical fiber ribbon array. The water-blocking assembly includes the water-blocking sealing layer formed by heating and curing a sealant. The water-blocking sealing layer wraps the surface of the optical fiber ribbon array in the axial direction of the optical fiber ribbon array and fills the gap between two adjacent optical fiber ribbons;

after the optical fiber ribbon array wrapped with the water-blocking assembly and the outer protection layer is cooled and formed, pulling and take-up are performed to form the above overhead ribbon cable.

In some embodiments, the operation that the plurality of optical fibers are prepared into the optical fiber ribbon specifically includes the following operations:

the plurality of optical fibers form an optical fiber group;

a connection layer fills a surface of the optical fiber group and gaps, and the connection layer, after photo-curing, forms the optical fiber ribbon together with the optical fiber group, the connection layer is a photo-cured coating containing a resin.

In some embodiments, the operation that the optical fiber ribbons are prepared into the optical fiber ribbon array specifically includes the following operation.

The plurality of optical fiber ribbons are unidirectionally stranded through a pay-off unit for active pay-off under a preset pay-off tension, and are stacked by an optical fiber ribbon parallel mould in the pay-off unit to form the optical fiber ribbon array.

In some embodiments, the preset pay-off tension is 2 N to 4 N, and a strand pitch of the pay-off unit is 400 mm to 800 mm.

In some embodiments, the operation that the surface of the optical fiber ribbon array is wrapped sequentially with the water-blocking assembly and the outer protection layer specifically includes the following operations:

the water-blocking sealing layer wraps and is formed on the surface of the optical fiber ribbon array and the gap between two adjacent optical fiber ribbons;

after a water-blocking tape wraps the surface of the optical fiber ribbon array wrapped with the water-blocking sealing layer, the optical fiber ribbon array horizontally enters a mold core of an extrusion head on an extrusion apparatus, the water-blocking assembly includes the water-blocking sealing layer and the water-blocking tape;

a plurality of reinforcing elements are uniformly distributed between a mold sleeve of the extrusion head and the mold core;

the outer protection layer is extruded between the mold sleeve and the mold core to form the overhead ribbon cable.

In some embodiments, the operation that the water-blocking sealing layer wraps and is formed on the surface of the optical fiber ribbon array and the gap between two adjacent optical fiber ribbons specifically includes the following operations:

the optical fiber ribbon array passes through a gluing apparatus, and the sealant wraps the surface of the optical fiber ribbon array and fills the gap between the two adjacent optical fiber ribbons by the gluing apparatus;

the optical fiber ribbon array wrapped with the sealant passes through a heating apparatus, and the sealant is cured in the heating apparatus to form the water-blocking sealing layer.

In some embodiments, the operation that after the optical fiber ribbon array wrapped with the water-blocking assembly and the outer protection layer is cooled and formed, pulling and take-up are performed to form the overhead ribbon cable specifically includes the following operation.

The optical fiber ribbon array wrapped with the water-blocking assembly and the outer protection layer is cooled sequentially by a vacuum water tank and a cooling water tank.

A third aspect of the disclosure provides a manufacturing system for an overhead ribbon cable. The manufacturing system is applied to the overhead ribbon cable. The manufacturing system includes a pay-off unit configured to form an optical fiber ribbon array. An output end of the pay-off unit is sequentially connected to a gluing apparatus, a heating apparatus, an extrusion apparatus, and a cooling apparatus. The optical fiber ribbon array sequentially passes through the pay-off unit, the gluing apparatus, the heating apparatus, and the extrusion apparatus at the same height.

In some embodiments, the cooling apparatus includes a vacuum water tank and a cooling water tank which are sequentially connected with an output end of the extrusion apparatus.

According to the overhead ribbon cable, the manufacturing method therefor, and the manufacturing method for the overhead ribbon cable, through the arrangement of the optical fiber ribbon array inside the overhead ribbon cable and the water-blocking assembly containing the water-blocking sealing layer outside the optical fiber ribbon array, the overhead ribbon cable is of a full-dry structure, full-section water blocking of the overhead ribbon cable is met, and compared with the existing layer-stranded optical cable structure, there is no need to fill the water-blocking ointment in the overhead ribbon cable, so that the overhead ribbon cable has the characteristics of being clean and environmentally friendly, and simple in structure, which helps to improve the splicing efficiency, and the structural size of the overhead ribbon cable is reduced, which helps to reduce the volume and weight of the overhead ribbon cable. At the same time, because the arrangement of the optical fiber ribbon in the optical fiber ribbon array is conducive to improving the communication capacity of the overhead ribbon cable and further improving the splicing efficiency of the overhead ribbon cable, the overhead ribbon cable may be spliced or directly prefabricated into an end at terminal optical assemblies in an information transmission device and a network, and the operation and maintenance costs are lower.

BRIEF DESCRIPTION OF THE DRAWINGS

In order to more clearly illustrate the embodiments of the disclosure or the technical solutions in the related art, the drawings used in the description of the embodiments or the related art will be briefly described below. It is apparent that the drawings described below are only some embodiments of the disclosure. Other drawings may further be obtained by those of ordinary skill in the art according to these drawings without creative efforts.

FIG. 1 is a schematic structural diagram of an overhead ribbon cable provided by an embodiment of the disclosure.

FIG. 3 is a schematic flowchart of forming a water-blocking assembly and an outer protection layer on a surface of an optical fiber ribbon array provided by an embodiment of the disclosure.

FIG. 4 is a schematic flowchart of forming a water-blocking sealing layer on an optical fiber ribbon array provided by an embodiment of the disclosure.

FIG. 5 is a schematic structural diagram of a manufacturing system for an overhead ribbon cable provided by an embodiment of the disclosure.

ILLUSTRATION OF REFERENCE SIGNS

Figure 2:
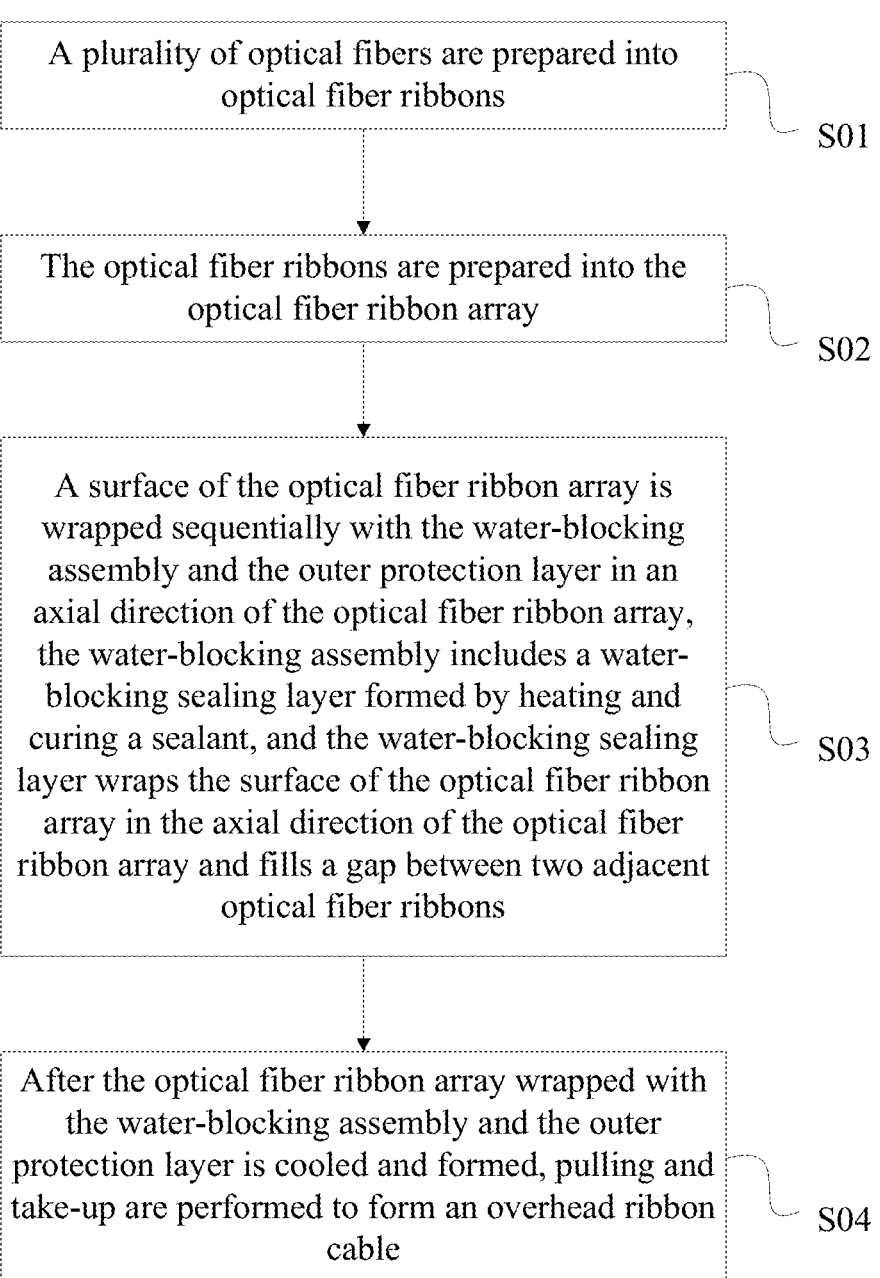
FIG. 2 is a schematic flowchart of a preparation method for an overhead ribbon cable provided by an embodiment of the disclosure.

10, Optical fiber ribbon array; 11, Optical fiber ribbon; 111, Optical fiber; 112, Connection layer; 20, Water-blocking sealing layer; 30, Water-blocking tape; 40, Reinforcing element; 50, Outer protection layer; 60, Identification line; 70, Rip cord;

80, Pay-off unit; 81, Gluing apparatus; 82, Heating apparatus; 83, Extrusion apparatus; 831, Outer protection layer extruder; 832, Identification line extruder; 833, Extrusion head; 84, Cooling apparatus; 841, Vacuum water tank; 842, Cooling water tank; 85, Water-blocking tape pay-off stand; 86, Reinforcing element pay-off stand; 87, Crawler traction device; 88, Take-up and pay-off device.

DETAILED DESCRIPTION OF THE EMBODIMENTS

At present, an overhead ribbon cable is usually of a layer-stranded optical cable structure. In the layer-stranded optical cable structure, an optical fiber unit is sleeved into a loose tube, and the loose tube is filled with a waterproof compound to protect the optical fiber unit in a manner of filling oil and blocking water. The loose tube is twisted around a strengthening core to form a compact cable core, and a gap in the cable core is filled with water-blocking gel. Through the water-blocking gel, the overhead ribbon cable ensures the stability and the water permeability of the overhead ribbon cable. The layer-stranded optical cable structure sequentially wraps the cable core with a polyethylene inner protection layer, an aramid layer, and an outer protection layer, so as to accommodate the water-blocking gel and play a certain role in protecting the cable core.

However, when the optical cable is overhead and introduced from outdoors to indoors, they must go through a switching process. During switching, considerable cost and time is required to clean the water-blocking gel filled in the layer-stranded optical cable, which not only brings inconvenience to the construction, affects the splicing efficiency, and is not conducive to shortening the maintenance time and operation and maintenance costs of the overhead ribbon cable in a later period, but also causes environmental pollution by the cleaned gel during optical fiber splicing.

In view of this, an embodiment of the disclosure provides an overhead ribbon cable, a manufacturing method and a manufacturing system for the overhead ribbon cable, through the arrangement of an optical fiber ribbon array inside the overhead ribbon cable and a water-blocking assembly containing a water-blocking sealing layer outside the optical fiber ribbon array, the overhead ribbon cable is of a full-dry structure, full-section water blocking of the overhead ribbon cable is met, and there is no need to fill the water-blocking gel in the overhead ribbon cable, so that the overhead ribbon cable has the characteristics of being clean and environmentally friendly, and simple in structure, which helps to improve the splicing efficiency, and the structural size of the overhead ribbon cable is reduced, which helps to reduce the volume and weight of the overhead ribbon cable. At the same time, because the arrangement of the optical fiber ribbon in the optical fiber ribbon array is conducive to improving a communication capacity and a splicing efficiency of the overhead ribbon cable, the overhead ribbon cable may be spliced or directly prefabricated into an end at terminal optical assemblies in an information transmission device and a network, and the operation and maintenance costs are lower.

In order to make the objects, technical solutions and advantages of the embodiments of the disclosure clearer, the technical solutions in the embodiments of the disclosure will be clearly and completely described in conjunction with the drawings in the embodiments of the disclosure. It is apparent that the described embodiments are only a part of the embodiments of the disclosure, and not all of them. All other embodiments obtained by those of ordinary skill in the art based on the embodiments of the disclosure without creative efforts are within the scope of protection of the disclosure.

Embodiment

Figure 1:
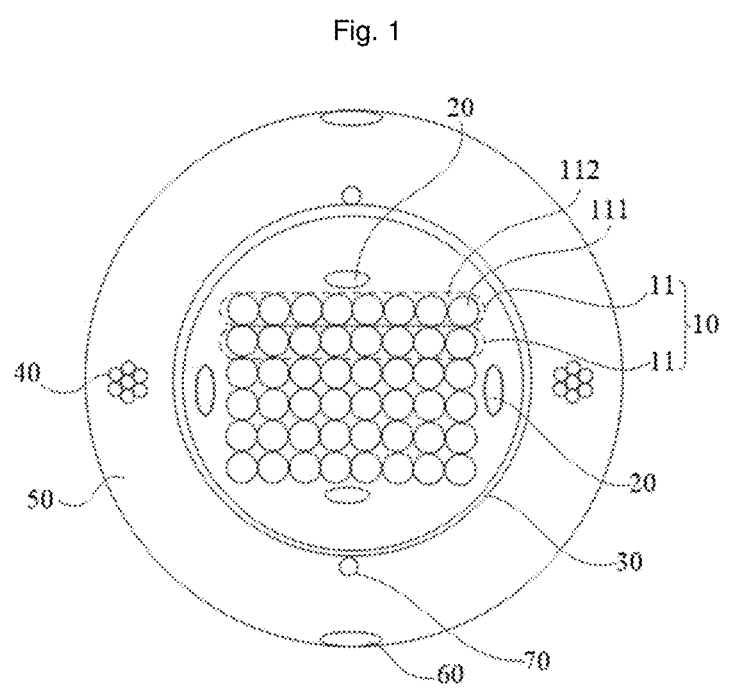

FIG. 1 is a schematic structural diagram of an overhead ribbon cable provided by an embodiment of the disclosure.

Referring to FIG. 1, an embodiment of the disclosure firstly provides the schematic structural diagram of the overhead ribbon cable. It can be seen from FIG. 1 that the overhead ribbon cable includes an optical fiber ribbon array 10. The optical fiber ribbon array 10 includes a plurality of optical fiber ribbons 11 arranged in an array. A surface of the optical fiber ribbon array 10 is wrapped sequentially with a water-blocking assembly and an outer protection layer 50 in an axial direction of the optical fiber ribbon array 10. The water-blocking assembly includes a water-blocking sealing layer 20 formed by heating and curing a sealant. The water-blocking sealing layer 20 wraps the surface of the optical fiber ribbon array 10 in the axial direction of the optical fiber ribbon array 10 and fills a gap between two adjacent optical fiber ribbons 11.

The optical fiber ribbon array 10 in the embodiment may be used as a cable core or an optical communication unit of the overhead ribbon cable for communication. According to the embodiment of the disclosure, through the arrangement of the optical fiber ribbon array 10 inside the overhead ribbon cable and the water-blocking assembly, where the water-blocking assembly includes the water-blocking sealing layer 20 formed by heating and curing the sealant, the overhead ribbon cable is of a full-dry structure, full-section water blocking of the overhead ribbon cable is met, and compared with the existing layer-stranded optical cable structure, the embodiment does not need to fill the water-blocking gel in the overhead ribbon cable for water blocking, so that the overhead ribbon cable has the characteristics of being clean and environmentally friendly, and simple in structure, which helps to improve the splicing efficiency. Moreover, there is no need to arrange a loose tube in the optical fiber ribbon array 10 and extrude a secondary wrapped protection layer outside the optical fiber ribbon array 10 to accommodate the water-blocking gel, so that the structural size of the overhead ribbon cable is reduced, which helps to reduce the volume and weight of the overhead ribbon cable, and makes the overhead ribbon cable develop towards lightweight.

At the same time, when the capacity of the optical fiber is increased, compared with the discrete optical fiber in the existing layer-stranded optical cable structure, the arrangement of the optical fiber ribbon 11 in the optical fiber ribbon array 10 is conducive to improving the communication capacity of the overhead ribbon cable, so that the overhead ribbon cable has higher splicing efficiency, and may be spliced or directly prefabricated into an end at terminal optical assemblies in an information transmission device and a network, and the operation and maintenance costs are lower.

The water-blocking sealing layer 20 may fill the gap between two adjacent optical fiber ribbons 11 as shown in FIG. 1 to fixedly connect the two adjacent optical fiber ribbons 11, and wrap a part of the surface of the optical fiber ribbon array 10 in the axial direction of the optical fiber ribbon array 10. Or, the water-blocking sealing layer 20 may also wrap a whole surface of the optical fiber ribbon array 10, that is, the water-blocking sealing layer 20 fully wraps the outer surface of the optical fiber ribbon array 10. In the embodiment, a wrapping form of the water-blocking layer 20 on the optical fiber ribbon array 10 is not further limited, as long as full-section water blocking of the overhead ribbon cable is met.

It is to be noted that, in the embodiment, the surface of the optical fiber ribbon array 10 is wrapped sequentially with the water-blocking assembly and the outer protection layer 50 in the axial direction of the optical fiber ribbon array 10, which may also be understood that the water-blocking assembly and the outer protection layer 50 fully wrap the surface of the optical fiber ribbon array 10 in the axial direction of the optical fiber ribbon array 10, the water-blocking assembly and the outer protection layer 50 are arranged from inside to outside.

Referring to FIG. 1 the optical fiber ribbon array 10 is formed by stacking the plurality of optical fiber ribbons 11 in parallel with each other. In this way, the optical fiber ribbon array 10 forms a stacked structure, the number of the optical fibers 111 in the stacked structure is controlled by controlling the number of the optical fiber ribbons 11, and the structures of the optical fiber ribbon array 10 and the overhead ribbon cable are made more compact under the same number of the optical fibers, so that a cable diameter is smaller.

The optical fiber ribbon 11 includes a plurality of optical fibers 111 and a connection layer 112. The plurality of optical fibers 111 are linearly arranged, the connection layer 112 is located between two adjacent optical fibers 111, the connection layer 112 wraps a surface of the each optical fiber 111 in an axial direction of the optical fiber 111, and the connection layer 112, after photo-curing, forms the optical fiber ribbon 11 together with the optical fibers 111. In this way, the plurality of optical fibers 111 in the optical fiber ribbon 11 are fixed through the connection layer 112, so that the plurality of optical fiber ribbons 11 are stacked to form the optical fiber ribbon array 10.

In order to facilitate the identification of the plurality of optical fibers 111 in the optical fiber ribbon 11, the optical fiber 111 is a colored fiber.

In some embodiments, the colored fiber may be a small-size optical fiber having a coating layer diameter of 170 μm to 210 μm, and a diameter of the optical fiber 111 after coloring may be 235 μm to 255 μm. In this way, the overhead ribbon cable has a smaller cable diameter without affecting the normal use of the overhead ribbon cable. Exemplarily, the type of the optical fiber 111 may be G.657, G.652, G.655, or other types of small-size optical fibers.

Specifically, in the embodiment, the optical fibers 111 in the optical fiber ribbon 11 may be 4-core to 36-core optical fibers. That is, the optical fiber ribbon 11 in the embodiment may use a 4-core optical fiber ribbon, a 6-core optical fiber ribbon, a 12-core optical fiber ribbon, a 24-core optical fiber ribbon, and a 36-core optical fiber ribbon. The color of the optical fiber 111 includes, but is not limited to, blue, orange, green, brown, gray, white, red, black, yellow, purple, pink, and green. It is to be noted that, the optical fiber 111 having more than 12 cores in the same optical fiber ribbon 11 may be identified by a color ring. The color ring in the optical fiber 111 may be identified by single and double color ring units or color ring spacing.

Exemplarily, in the embodiment, the 4-core optical fiber ribbon has a width of 1.05 mm to 1.15 mm and a thickness of 0.24 mm to 0.34 mm. The 6-core optical fiber ribbon has a width of 1.55 mm to 1.65 mm and a thickness of 0.29 mm. The 12-core optical fiber ribbon has a width of 3.15 mm to 3.25 mm and a thickness of 0.29 mm. The 24-core optical fiber ribbon has a width of 6.85 mm to 6.95 mm and a thickness of 0.32 mm. The 36-core optical fiber ribbon has a width of 9.35 mm to 9.45 mm and a thickness of 0.32 mm.

Because the elastic modulus of the connection layer 112 affects the softness of the optical fiber ribbon 11, and the elongation at break affects the difficulty in stripping the optical fiber 111 in the optical fiber ribbon 11, in the embodiment, the connection layer 112 has a viscosity of 3800 mPa·S to 4500 mPa·S at 25° C. and a density of 1.08 g/cm³ to 1.15 g/cm³ before curing, and the connection layer 112 has an elastic modulus of 350 MPa to 650 MPa, an elongation at break of not less than 35%, and a tensile strength of not less than 15 MPa under preset conditions. The preset conditions are 2.5% elastic deformation and a test temperature of 23° C. In this way, the cured optical fiber ribbon 11 has good flexibility and torsional resistance, and the minimum bending diameter may be less than 10 mm to avoid bending. Moreover, the optical fiber 111 in the optical fiber ribbon 11 has good separability, and the coated connection layer 112 is not adhered when the optical fiber 111 is stripped. Therefore, the arrangement of the connection layer 112 in the optical fiber ribbon 11 is not only conducive to the control of the attenuation stability of the optical fiber 111 during cabling and the convenience of construction splicing, but also conducive to splicing and retention of the optical fiber ribbon 11 in a smaller joint box space without bending.

It should be understood that the above 2.5% elastic deformation may be understood as the degree of elastic deformation of the connection layer 112 relative to an original structure of the connection layer 112.

In some embodiments, the connection layer 112 is formed by curing a photo-cured coating containing a resin. The resin may be an acrylic resin or other resin materials capable of making the photo-cured coating form the connection layer 112. The connection layer 112 may be regarded as the optical fiber 111 with the resin. In this way, the plurality of optical fiber ribbons 11 wrapped with the connection layer 112 may be cured under the action of light, such as ultraviolet light, to form the optical fiber ribbons 11. The cured optical fiber ribbon 11 has a smooth and non-sticky surface, no layering, and no loose fiber.

It is to be noted that, in order to facilitate the identification of the optical fiber ribbon 11 in the optical fiber ribbon array 10, in the embodiment, the optical fiber ribbon 11 in the optical fiber ribbon array 10 may be a color-free photo-cured coating, or the surface of the optical fiber ribbon 11 may also be printed for identification.

Specifically, in the embodiment, the number of the optical fiber ribbons 11 contained in the optical fiber ribbon array 10 may be 6 to 24, and the total number of the cores of the overhead ribbon cable may be 24 cores to 864 cores, which may meet the transmission requirements of large communication capacity of the overhead ribbon cable. An overhead ribbon cable including an optical fiber ribbon array 10 containing six 8-core optical fiber ribbons 11 is as shown in FIG. 1. The overhead ribbon cable may be regarded as a 48-core overhead ribbon cable. The 8-core optical fiber ribbon has a width of 2.05 mm to 2.15 mm and a thickness of 0.24 mm to 0.35 mm, and the flatness of the optical fiber ribbon 11 is not more than 30 mm. The 48-core overhead ribbon cable has an overall cable diameter of 6.9 mm to 7.1 mm, a cable weight of 38 kg/km, where the positive and negative errors of the cable weight are not more than 10%, and a breaking force of less than or equal to 2000 N. Compared with the existing conventional 48-core layer-stranded optical cable, the 48-core overhead ribbon cable in the embodiment has the characteristics of being small in cable diameter, light in weight, and easy to strip, and uses the full-dry type optical fiber ribbon structure, which is not only clean and environmentally friendly, and convenient to splice, but also lower in the construction and operation and maintenance costs of the optical cable.

The water-blocking sealing layer 20 is of an elastic structure. In this way, when the two adjacent optical fiber ribbons 11 are connected through the water-blocking sealing layer 20, the two adjacent optical fiber ribbons 11 may move relatively, which ensures a stable transmission of the optical fiber ribbon array 10, and is beneficial to the extraction and splicing of optical units during construction and operation and maintenance.

Exemplarily, the sealant is a water swellable water-blocking filling adhesive. The water-blocking filling adhesive is a gel in a viscous state before curing. In a gluing apparatus 81, the water-blocking filler wraps the surface of the optical fiber ribbon array 10 in the axial direction of the optical fiber ribbon array 10, and fills the gap between two adjacent optical fiber ribbons 11. After curing, the water-blocking filler forms a deformable elastic structure such as a rubber body, which has the characteristics of being resistant to water pressure impact, tack-free, easy to strip, and good in flexibility. The cured water-blocking filling adhesive may be bonded with high-molecular polymer materials and metal or non-metal elements, and has good compatibility with the materials of components of the overhead ribbon cable.

The cured water-blocking filling adhesive has a hardness of 25 HA to 40 HA, a density of 0.8 g/cm$^3$ to 1.1 g/cm$^3$, and a use temperature of –60° C. to 200° C. The curing time of the water-blocking filling adhesive is 8 h to 24 h at normal temperature, and the heat treatment may accelerate the curing process to shorten the manufacturing efficiency of the overhead ribbon cable in the embodiment.

Compared with the traditional water-blocking gel, in the embodiment, the water-blocking sealing layer 20 formed by using the sealant has the advantages that the water-blocking sealing layer 20 not only is clean and environmentally friendly, and is formed by heating and curing, but also does not need to extrude the secondary wrapped protection layer (such as a through sleeve or polyethylene inner protection layer, etc.) outside the optical fiber ribbon array 10 to accommodate the gel, so that the structural size of the overhead ribbon cable is reduced, and the overhead ribbon cable has a smaller cable diameter. Compared with the conventional water-blocking yarn, in the embodiment, the water-blocking sealing layer 20 formed by using the sealant has the advantages that the cured sealant has good flexibility, may be well bonded with the optical fiber ribbon 11 without affecting the transmission performance of the optical fiber 111, and is difficult to rub the optical fiber ribbon 11 to cause high attenuation of the optical fiber 111.

It is to be noted that the water-blocking filling adhesive that meets the above requirements in the related art may be used in the embodiment. In the embodiment, the composition of the water-blocking filling adhesive is not further elaborated.

Further, referring to FIG. 1, the water blocking assembly includes a water-blocking tape 30. The water-blocking tape 30 fully wraps the surface of the optical fiber ribbon array 10 in the axial direction of the optical fiber ribbon array 10, and the water-blocking sealing layer 20 is located at a side, facing the optical fiber ribbon array 10, of the water-blocking tape 30. In this way, the arrangement of the water-blocking tape 30 on the basis of the water-blocking sealing layer 20 may enhance the water-blocking performance of the water-blocking assembly for the optical fiber ribbon array 10, and at the same time facilitate the formation of the outer protection layer 50.

In some embodiments, a surface, close to the optical fiber ribbon array 10, of the water-blocking tape 30 is a smooth surface, and a surface, close to the outer protection layer 50, of the water-blocking tape 30 is a rough surface. In this way, the formation of the outer protection layer 50 is facilitated, while the smooth surface of the water-blocking tape 30 faces the optical fiber ribbon array 10 to avoid the water-blocking tape 30 rubbing the optical fiber ribbon 11, thereby reducing the influence of the water-blocking tape 30 on the transmission performance of the optical fiber ribbon array 10.

Exemplarily, the water-blocking tape 30 may be formed by single-sided compounding of a polymer (such as poly-ethylene terephthalate) fiber non-woven fabric with a high water absorbent material in the related art. A polyester film surface is smooth, and one surface where the high water absorbent material is located is a rough surface. The water-blocking tape 30 may also use other high polymer materials having excellent water blocking and oil blocking characteristics. In the embodiment, the types of the high polymer material and the high water absorbent material are not further limited.

The water-blocking tape 30 in the embodiment of the disclosure have the following performance indexes: the width of the water-blocking tape 30 is 12.5 mm to 13.5 mm, the thickness is 1.0 mm to 1.5 mm, the expansion rate of water absorbing is not less than 6 mm/min, the tensile strength is 15 N/cm to 30 N/cm, the short-term (for example, within 20 s) thermal stability temperature is 230° C. to 250° C., and the lateral shrinkage rate does not exceed 25%.

It is to be noted that, when 12-core to 36-core optical fiber ribbons are used in the optical fiber ribbon array 10, in order to meet the water-blocking effect of the whole section of the cable core, two or more layers of the water-blocking tapes 30 fully wrap the optical fiber ribbon array 10.

Further, in order to meet the water-blocking effect of the whole section of the cable core, the embodiment may also coat the surface of the water-blocking tape 30 or the surface of the optical fiber ribbon 11 with water-blocking powder in the related art, so as to ensure longitudinal water blocking of the optical fiber ribbon array 10 and the overhead ribbon cable.

In order to enhance the strength of the overhead ribbon cable, referring to FIG. 1, a plurality of reinforcing elements 40 are further arranged in the outer protection layer 50, and the plurality of reinforcing elements 40 are parallel in the axial direction of the optical fiber ribbon array 10 and are symmetrically distributed in the outer protection layer 50. In this way, the reinforcing elements 40 are symmetrically embedded in the outer protection layer 50 to enhance the strength of the overhead ribbon cable.

The reinforcing element 40 may be a metal element, such as a phosphated steel wire, a galvanized steel wire, a galvanized steel strand or a copper-plated steel strand, etc. Or, the reinforcing element 40 may also be a non-metal element, such as a glass fiber reinforced plastic rod, an aramid fiber reinforced plastic rod, a carbon fiber reinforced plastic rod, etc. When the non-metal reinforcing element is used, the overhead ribbon cable is an all-dielectric optical cable, which may be applied to areas with high lightning incidence or strong electromagnetic fields.

It is to be noted that the reinforcing element 40 in the embodiment uses the copper-plated steel strand having a nominal diameter of 0.65 mm to 0.67 mm and a breaking force of 450 N to 550 N. Exemplarily, the number of the reinforcing elements 40 may be 2, 4 or more. In the embodiment, the number of the reinforcing elements 40 is not further limited.

In order to facilitate the identification and improve the construction efficiency, referring to FIG. 1, a surface of the outer protection layer 50 is further provided with an identification line 60. In order to facilitate the stripping of the outer protection layer 50, a connection of the outer protection layer 50 and the water-blocking assembly is further provided with a plurality of rip cords 70, the rip cords 70 and the identification line 60 are parallel to an axis of the optical fiber ribbon array 10, and the plurality of rip cords 70 are uniformly distributed on a peripheral side of the optical fiber ribbon array 10.

In some embodiments, the identification line 60 may be embedded in the outer protection layer 50, and the outermost part of the identification line 60 is exposed to the surface of the outer protection layer 50. Or, the identification line 60 may also be of a convex or concave structure formed on the surface of the outer protection layer 50. When the identification line 60 is of the convex or concave structure on the outer protection layer 50, the shape of the identification line 60 may be triangular or semicircular, and the depth of a recess or the height of a bulge generally does not exceed 0.2 mm.

As shown in FIG. 1, an angle between the identification line 60 and the reinforcing element is 80° to 100° on the outer protection layer 50, and an angle between a placement direction of the rip cord 70 in the axial direction of the optical fiber ribbon array 10 and the reinforcing element is 70° to 110°.

It is to be noted that the identification line 60 may be made of the same material as the outer protection layer 50, such as a polyethylene material, which makes the identification line 60 and the outer protection layer 50 have good compatibility. The colors of the identification line 60 and the outer protection layer 50 are different to facilitate the identification of the identification line 60. At the same time, the outer protection layer 50 is made of high-density polyethylene, and the wall thickness of the outer protection layer 50 in the embodiment is 1.3 mm to 1.7 mm, so that the overhead ribbon cable not only meets the ultraviolet and oxidation resistance, but also ensures the light and weather resistance of the overhead ribbon cable during operation. The color of the outer protection layer 50 is generally black, but may also be colorful for facilitating the identification. Exemplarily, when the axial section of the overhead ribbon cable is circular, the outer protection layer 50 may be regarded as an annular outer sheath, and the water-blocking tape 30 may be regarded as an annular water-blocking tape.

In some embodiments, the outer protection layer 50 may also be made of a nylon material (such as nylon 6 or nylon 12), a thermoplastic elastic material, a low-smoke halogen-free flame retardant polyolefin material or other materials that meet the overhead ribbon cable. In the embodiment, the materials of the outer protection layer 50 and the identification line 60 are not further limited.

Exemplarily, in the embodiment, the identification line 60 is made of yellow polyethylene, and has a width of 0.10 mm to 0.20 mm and a thickness of 0.1 mm to 0.2 mm. The rip cord 70 may be made of a twisted 600D aramid material or other materials.

In order to verify the water permeability of the overhead ribbon cable of the disclosure, the 3 m 48-core overhead ribbon cable of the embodiment is subjected to a 24 h water test under a 1 m water column, and the test result shows that the water seepage length of the cable core of the overhead ribbon cable of the disclosure is less than or equal to 1.5 m, which meets full-section water blocking of the overhead ribbon cable.

It is to be noted that the water test of the overhead ribbon cable under the water column is the related art in this field, and the specific process of the water test will not be further elaborated in the embodiment.

FIG. 2 is a schematic flowchart of a preparation method for an overhead ribbon cable provided by an embodiment of the disclosure, FIG. 3 is a schematic flowchart of forming a water-blocking assembly and an outer protection layer on a surface of an optical fiber ribbon array provided by an embodiment of the disclosure, and FIG. 4 is a schematic flowchart of forming a water-blocking sealing layer on an optical fiber ribbon array provided by an embodiment of the disclosure.

On the basis of the above, with reference to FIG. 2 and in conjunction with FIG. 1, the embodiments of the disclosure further provide a manufacturing method for an overhead ribbon cable. The manufacturing method is applied to the above overhead ribbon cable. The manufacturing method includes the following operations.

At S01, a plurality of optical fibers are prepared into an optical fiber ribbon. In this way, an optical fiber ribbon array 10 is formed by the optical fiber ribbons 11, compared with the discrete optical fiber in the existing layer-stranded optical cable structure, the communication capacity of the overhead ribbon cable is improved, so that the overhead ribbon cable has higher splicing efficiency.

Specifically, S01 specifically includes the following operations:

The plurality of optical fibers form an optical fiber group;

A connection layer fills a surface of the optical fiber group and gaps, and the connection layer, after photo-curing, forms the optical fiber ribbon together with the optical fiber group. The connection layer is a photo-cured coating containing a resin.

It is to be noted that, active pay-off is performed on a certain number of optical fibers 111, such as 8 colored fibers, under a constant pay-off tension (such as 2 N to 4 N), and the plurality of colored fibers are integrally converged in parallel through a guide roller according to a certain order of arrangement (such as horizontal arrangement), and enter, after electrostatic dust removal, a doubling apparatus of the optical fiber ribbon 11 to form a horizontal optical fiber group. Then, the whole optical fiber group enters a curing apparatus of the optical fiber ribbon 11. The curing apparatus has a flow channel for the photo-cured coating. By adjusting a filling pressure of the resin in the photo-cured coating in the optical fiber group, the resin uniformly wraps the surface of the optical fiber group and fills a gap between two adjacent colored fibers. The optical fiber group wrapped with the resin is cured by ultraviolet light to form the optical fiber ribbon 11.

The plurality of colored fibers may pass through the doubling apparatus and the curing apparatus along a straight line at the same height.

At S02, the optical fiber ribbons are prepared into the optical fiber ribbon array.

Specifically, S02 specifically includes the following operation:

the plurality of optical fiber ribbons 11 are unidirectionally stranded through a pay-off unit 80 for active pay-off under a preset pay-off tension, and are stacked by an optical fiber ribbon twisting closer in the pay-off unit to form the optical fiber ribbon array 10.

It is to be noted that the preset pay-off tension is 2 N to 4 N, and a strand pitch of the pay-off unit 80 is 400 mm to 800 mm. The strand pitch may be understood as a distance that a wire such as the optical fiber ribbon 11 rotates one circle along a twisted wire of the pay-off unit 80.

The excess-length of the optical fiber 111 is the most important control parameter during the manufacturing of the optical cable, which directly determines the quality of the optical cable and the performance of the optical cable, so that the embodiment ensures that the optical fiber ribbon array 10 forms a certain second optical fiber excess-length on an outer protection layer 50 by controlling the pay-off tension and the strand pitch of the pay-off unit 80. The second optical fiber excess-length may be understood as the excess-length of the optical fiber 111 relative to a plastic sleeve such as the outer protection layer 50 during the manufacturing of a secondary plastic sleeve of the optical fiber 111.

At S03, a surface of the optical fiber ribbon array is wrapped sequentially with a water-blocking assembly and the outer protection layer in an axial direction of the optical fiber ribbon array. The water-blocking assembly includes a water-blocking sealing layer formed by heating and curing a sealant. The water-blocking sealing layer wraps the surface of the optical fiber ribbon array in the axial direction of the optical fiber ribbon array and fills a gap between two adjacent optical fiber ribbons. In this way, the full-dry structure of the overhead ribbon cable is formed, so that full-section water blocking of the overhead ribbon cable is met, and the overhead ribbon cable has the characteristics of being clean and environmentally friendly, which helps to improve the splicing efficiency and reduces the structural size of the overhead ribbon cable.

Specifically, with reference to FIG. 3 and in conjunction with FIG. 1, in S03, the operation that the surface of the optical fiber ribbon array is wrapped sequentially with the water-blocking assembly and the outer protection layer in the axial direction of the optical fiber ribbon array specifically includes the following operation.

At S31, the water-blocking sealing layer wraps and is formed on the surface of the optical fiber ribbon array and the gap between two adjacent optical fiber ribbons.

Specifically, with reference to FIG. 4 and in conjunction with FIG. 1, S31 specifically includes the following operations.

At S311, the optical fiber ribbon array passes through a gluing apparatus, and the sealant wraps the surface of the optical fiber ribbon array and fills the gap between the two adjacent optical fiber ribbons through the gluing apparatus.

It is to be noted that the optical fiber ribbon array 10 enters a gluing mold of the gluing apparatus 81, the gluing mold has a glue storage bin and a gluing channel, the glue storage bin is connected to a gluing valve through the gluing channel, and an external automation device such as a controller is used to control the pressure in the gluing mold, so as to continuously fill the sealant on the optical fiber ribbon array 10. At the same time, by controlling the gluing pressure of the gluing valve, it is ensured that the sealant wraps the surface of the optical fiber ribbon array 10 and fills the gap between two adjacent optical fiber ribbons 11.

At S312, the optical fiber ribbon array wrapped with the sealant passes through a heating apparatus, and the sealant is cured in the heating apparatus to form the water-blocking sealing layer.

It is to be noted that the optical fiber ribbon array 10 wrapped with the sealant comes out of the gluing mold and then passes through a wire passing mold of the gluing apparatus 81, and the excess sealant on the optical fiber ribbon array 10 is removed by the wire passing mold. Then, the optical fiber ribbon array 10 enters the heating apparatus 82 again. In the embodiment, the heating apparatus 82 may use a resistance wire or other structures to heat the optical fiber ribbon 11, a heating area in the heating apparatus 82 has a length of 100 cm to 120 cm and a heating temperature of 80° C. to 110° C. The sealant is thermally cured in the heating apparatus 82 to form an elastic structure with elastic deformation, such as a rubber body. The rubber body wraps the surface of the optical fiber ribbon array 10 and fills the gap between two adjacent optical fiber ribbons 11.

At S32, after a water-blocking tape wraps the surface of the optical fiber ribbon array wrapped with the water-blocking sealing layer, the optical fiber ribbon array horizontally enters a mold core of an extrusion head on an extrusion apparatus. The water-blocking assembly includes the water-blocking sealing layer and the water-blocking tape.

It is to be noted that, before the optical fiber ribbon array 10 horizontally enters the mold core of the extrusion head 833 on the extrusion apparatus 83, the water-blocking tape 30 is firstly arranged on the periphery of the optical fiber ribbon array 10 and then passes through a longitudinal wrap mold of the existing longitudinal wrap apparatus together with the optical fiber ribbon array 10 to perform longitudinal wrap lap of the water-blocking tape 30. The lap width of the water-blocking tape 30 is 0.5 mm to 1.5 mm, so as to ensure that the water-blocking tape 30 wraps the periphery of the optical fiber ribbon array 10, and then the optical fiber ribbon array 10 wrapped with the water-blocking tape 30 horizontally enters the mold core of the extrusion head.

FIG. 5 is a schematic structural diagram of a manufacturing system for an overhead ribbon cable provided by Embodiment 4 of the disclosure.

At S33, a plurality of reinforcing elements are uniformly distributed between a mold sleeve of the extrusion head and the mold core. In this way, the reinforcing elements are conveniently embedded in the outer protection layer.

It is to be noted that, with reference to FIG. 3 and in conjunction with FIG. 1 and FIG. 5, the reinforcing element 40 may be placed between the mold sleeve and the mold core of the extrusion head 833 through a reinforcing element pay-off stand 40. The number of the reinforcing element pay-off stands 40 and the number of the reinforcing elements 40 are equal and in one-to-one correspondence, so that the placement position of the corresponding reinforcing element 40 may be controlled by the reinforcing element pay-off stand 40.

At S34, the outer protection layer is extruded between the mold sleeve and the mold core to form the overhead ribbon cable.

It is to be noted that the mold sleeve and the mold core form the extrusion mold in the extrusion head 833. In the embodiment, the outer protection layer 50 and the identification line 60 are simultaneously extruded between the mold sleeve and the mold core of the same extrusion head 833 in a co-extrusion forming manner.

At S04, after the optical fiber ribbon array wrapped with the water-blocking assembly and the outer protection layer is cooled and formed, pulling and take-up are performed to form the overhead ribbon cable.

Specifically, as shown in FIG. 5, S04 specifically includes the following operation.

The optical fiber ribbon array 10 wrapped with the water-blocking assembly and the outer protection layer 50 is cooled sequentially by a vacuum water tank 841 and a cooling water tank 842.

It is to be noted that the optical fiber ribbon array 10 wrapped with the water-blocking assembly and the outer protection layer 50 comes out of the extrusion head 833 and firstly enters the vacuum water tank 841. The vacuum tank 841 is provided with a sizing copper sleeve. By adjusting the vacuum pressure of the vacuum water tank 841, the optical cable of the optical fiber ribbon array 10 is cooled and formed in the sizing copper sleeve with a preset outer diameter size. After the optical fiber ribbon array 10 passes through the vacuum water tank 841, on the one hand, the outer protection layer 50 is stably formed and has the smooth surface, on the other hand, partial structures of the outer protection layer 50 and the water-blocking tape 30 may not be recessed to ensure that the optical fiber ribbon array 10 has a certain degree of freedom in the water-blocking tape 30 and the outer protection layer 50, so that the overhead ribbon cable has a uniform outer diameter, a circular section and a controllable size, and the overall non-roundness is not more than 3%.

The non-roundness may be understood as a difference between the maximum diameter and the minimum diameter on the cross-section of the circular metal material. After the optical fiber ribbon array 10 comes out of the vacuum water tank 841 and then is cooled and formed in the cooling water tank 842, pulling and take-up are performed to form the overhead ribbon cable. The vacuum water tank 841 has a length of 4 m to 5 m and a water temperature of 25° C. to 35° C.

It should be understood that the use of the extrusion mold in the extrusion head 833 and the arrangement of the vacuum water tank 841 in the embodiment not only ensure a certain degree of freedom of the optical fiber ribbon array 10 in the outer protection layer 50, and qualified and stable transmission performance of the optical unit during extrusion and forming of the outer protection layer 50, but also are conducive to the extraction and splicing of optical fiber ribbon array 10 during construction and operation and maintenance.

On the basis of the above, referring to FIG. 5, the embodiments of the disclosure further provide a schematic structural diagram of a manufacturing system for an overhead ribbon cable. The manufacturing system includes a pay-off unit 80 configured to form an optical fiber ribbon array 10. An output end of the pay-off unit 80 is sequentially connected to a gluing apparatus 81, a heating apparatus 82, an extrusion apparatus 83, and a cooling apparatus 84. The optical fiber ribbon array 10 sequentially passes through the pay-off unit 80, the gluing apparatus 81, the heating apparatus 82, and the extrusion apparatus 83 at the same height. In this way, the overhead ribbon cable may be always kept in a horizontal state during the manufacturing, which is conducive to ensuring that the tension control of each optical fiber ribbon 11 in the optical fiber ribbon array 10 is consistent, so that the overhead ribbon cable has stable transmission performance during the forming.

In some embodiments, the pay-off unit 80 is provided with an optical fiber ribbon parallel mold, and the gluing apparatus 81 is sequentially provided with a gluing mold and a wire passing mold in a direction of movement of the optical fiber ribbon 11. The extruding apparatus 83 includes an outer protection layer extruder 831 and an identification line extruder 832. The extruder and the identification line extruder 832 share one extrusion head 833, and the extrusion head 833 is provided with the extrusion mold. The optical fiber ribbon parallel mold, the gluing mold, the wire passing mold, the heating apparatus 82, and the extrusion mold are all located on the same horizontal line, so that the optical fiber ribbon array 10 is always kept in the horizontal state during the manufacturing.

The optical fiber ribbon parallel mold, the wire passing mold, the extrusion mold, and a longitudinal wrap mold may refer to the relevant molds in the optical cable manufacturing. In the embodiment, the structures of the optical fiber ribbon parallel mold, the wire passing mold, the extrusion mold, and the longitudinal wrap mold are not further limited.

It is to be noted that the manufacturing system further includes a water-blocking tape pay-off stand 85 configured to place a water-blocking tape 30 and a reinforcing element pay-off stand 40 configured to place a reinforcing element 40. The water-blocking tape pay-off stand 85 and the reinforcing element pay-off stand 40 are arranged between the heating apparatus 82 and the extrusion apparatus 83.

Further, referring to FIG. 5, the cooling apparatus 84 includes a vacuum water tank 841 and a cooling water tank 842 which are sequentially connected to an output end of the extrusion apparatus 83. The vacuum water tank 841 may be connected with the extrusion head 833 of the extrusion apparatus 83, and is located on the same horizontal line with the extrusion head 833, so that the overhead ribbon cable is always kept in the horizontal state during the manufacturing and forming, so that the overhead ribbon cable has stable transmission performance during the forming.

In the embodiment, the manufacturing system further includes a crawler traction device 87 and a take-up and pay-off device 88 which are sequentially connected to an output end of the cooling water tank 842. The overhead ribbon cable may be pulled by the crawler traction device 87 during the manufacturing of the overhead ribbon cable, and take-up may be performed on the overhead ribbon cable by the take-up and pay-off device 88.

It is to be noted that in the embodiment, the pay-off unit 80 may be a cage strander in the related art. The pay-off unit 80, the gluing apparatus 81, the heating apparatus 82, the extrusion apparatus 83, and the cooling apparatus 84 may be referred to the relevant descriptions above, and in the embodiment, the pay-off unit 80, the gluing apparatus 81, the heating apparatus 82, the extrusion apparatus 83, and the cooling apparatus 84 will not be further elaborated.

According to the overhead ribbon cable, the manufacturing method therefor, and the manufacturing method therefor, through the arrangement of the optical fiber ribbon array inside the overhead ribbon cable, the conventional layer-stranded optical cable structure is replaced, so that the overhead ribbon cable forms the full-dry structure, full-section water blocking of the optical cable is met, splicing is convenient, the capacity of the optical fiber is improved, and the overhead ribbon cable is small in outer diameter, light in weight and more suitable for overhead laying. At the same time, the water-blocking assembly containing the water-blocking sealing layer is arranged outside the optical fiber ribbon array, so as to ensure the stable transmission performance and water permeability of the overhead ribbon cable, and make the overhead ribbon cable have the characteristics of being simple in structure, and clean and environmentally friendly.

In the description of the disclosure, it is to be understood that the orientations or positional relationships indicated by the terms "center", "longitudinal", "transverse", "length", "width", "thickness" "upper", "down", "front", "rear", "left", "right", "vertical", "horizontal", "top", "bottom", "interior", "exterior", etc. are based on the orientations or positional relationships shown in the drawings, and are only for the convenience of describing the disclosure and simplifying the description. The description does not indicate or imply that the device or element referred to must have a specific orientation, be constructed and operated in a specific orientation, and therefore cannot be construed as limiting the disclosure.

In the description of the disclosure, it should be understood that terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The terms "install", "link", "connect", "set" should be broadly understood, unless otherwise specified and defined, for example, may be fixedly connected, or detachably connected, or integrally connected; and may be directly connected or indirectly connected through an intermediate medium, and may be the internal communication of two elements or the interaction relationship between two elements. The specific meaning of the above-mentioned terminology in the disclosure may be understood by those of ordinary skill in the art in specific circumstances. In addition, the terms "first", "second", etc. are used for descriptive purposes only, and cannot be understood as indicating or implying relative importance.

Finally, it is to be noted that the above embodiments are only intended to illustrate the technical solutions of the disclosure, but not intended to limit the disclosure. Although the disclosure is described in detail with reference to the foregoing embodiments, it should be understood by those of ordinary skill in the art that: they may still make modifications to the technical solutions described in the foregoing embodiments or equivalent replacements to part or all of the technical features without any modification of the technical solutions or departures from the scope of the technical solutions of the embodiments of the disclosure.

What is claimed is:

1. An overhead ribbon cable, comprising an optical fiber ribbon array, wherein the optical fiber ribbon array comprises a plurality of optical fiber ribbons arranged in an array, a surface of the optical fiber ribbon array being wrapped sequentially with a water-blocking assembly and an outer protection layer in an axial direction of the optical fiber ribbon array, the water-blocking assembly comprising a water-blocking sealing layer formed by heating and curing a sealant, and the water-blocking sealing layer wrapping the surface of the optical fiber ribbon array in the axial direction of the optical fiber ribbon array and filling a gap between two adjacent optical fiber ribbons;

wherein the water-blocking sealing layer is of an elastic structure, the sealant is a water swellable water-blocking filling adhesive, and the cured water-blocking filling adhesive has a hardness of 25 HA to 40 HA, a density of 0.8 g/cm$^3$ to 1.1 g/cm$^3$, and a use temperature of −60° C. to 200° C.;

wherein the optical fiber ribbon array is formed by stacking the plurality of optical fiber ribbons in parallel with each other, each optical fiber ribbon comprises a plurality of optical fibers and a connection layer, wherein the plurality of optical fibers are linearly arranged, the connection layer is located between two adjacent optical fibers, the connection layer wraps a surface of each optical fiber in an axial direction of the each optical fiber, and the connection layer, after photo-curing, forms the optical fiber ribbon together with the optical fibers, the connection layer has a viscosity of 3800 mPa·S to 4500 mPa·S at 25° C. and a density of 1.08 g/cm$^3$ to 1.15 g/cm$^3$ before curing, and the connection layer has an elastic modulus of 350 MPa to 650 MPa, an elongation at break of not less than 35%, and a tensile strength of not less than 15 MPa under preset conditions, wherein the preset conditions are 2.5% elastic deformation and 23° C.

2. The overhead ribbon cable according to claim 1, wherein the connection layer is formed by curing a photo-cured coating containing a resin, and the resin is an acrylic resin.

3. The overhead ribbon cable according to claim 1, wherein the each optical fiber is a colored fiber.

4. The overhead ribbon cable according to claim 1, wherein the water blocking assembly comprises a water-blocking tape, wherein the water-blocking tape fully wraps the surface of the optical fiber ribbon array in the axial direction of the optical fiber ribbon array, and the water-blocking sealing layer is located at a side, facing the optical fiber ribbon array, of the water-blocking tape.

5. The overhead ribbon cable according to claim 4, wherein a surface, adjacent to the optical fiber ribbon array, of the water-blocking tape is a smooth surface, and a surface, adjacent to the outer protection layer, of the water-blocking tape is a rough surface.

6. The overhead ribbon cable according to claim 1, wherein a plurality of reinforcing elements are further arranged in the outer protection layer, and the plurality of reinforcing elements are parallel in the axial direction of the optical fiber ribbon array and are symmetrically distributed in the outer protection layer.

7. The overhead ribbon cable according to claim 6, wherein a surface of the outer protection layer is further provided with an identification line, a connection of the outer protection layer and the water-blocking assembly is further provided with a plurality of rip cords, the rip cords and the identification line are parallel to an axis of the optical fiber ribbon array, and the plurality of rip cords are uniformly distributed on a peripheral side of the optical fiber ribbon array.

8. A manufacturing method for an overhead ribbon cable, wherein the manufacturing method is applied to the overhead ribbon cable according to claim 1, and the manufacturing method comprises:

preparing a plurality of optical fibers into the optical fiber ribbons;

preparing the optical fiber ribbons into the optical fiber ribbon array;

wrapping a surface of the optical fiber ribbon array sequentially with the water-blocking assembly and the outer protection layer in an axial direction of the optical fiber ribbon array, wherein the water-blocking assembly comprises the water-blocking sealing layer formed by heating and curing the sealant, the water-blocking sealing layer wrapping the surface of the optical fiber ribbon array in the axial direction of the optical fiber ribbon array and filling the gap between two adjacent optical fiber ribbons;

and after the optical fiber ribbon array wrapped with the water-blocking assembly and the outer protection layer is cooled and formed, performing pulling and take-up to form the overhead ribbon cable.

9. The manufacturing method according to claim 8, wherein the preparing a plurality of optical fibers into the optical fiber ribbons specifically comprises:

forming, by the plurality of optical fibers, an optical fiber group; and filling a connection layer in a surface of the optical fiber group and gaps, and forming, by the connection layer after photo-curing, the optical fiber ribbon together with the optical fiber group, wherein the connection layer is a photo-cured coating containing a resin.

10. The manufacturing method according to claim 9, wherein the preparing the optical fiber ribbons into the optical fiber ribbon array specifically comprises:

unidirectionally stranding the plurality of optical fiber ribbons through a pay-off unit and performing active pay-off under a preset pay-off tension, and stacking by an optical fiber ribbon parallel mould in the pay-off unit to form the optical fiber ribbon array.

11. The manufacturing method according to claim 10, wherein the preset pay-off tension is 2 N to 4 N, and a strand pitch of the pay-off unit is 400 mm to 800 mm.

12. The manufacturing method according to claim 8, wherein the wrapping the surface of the optical fiber ribbon array sequentially with the water-blocking assembly and the outer protection layer specifically comprises:

wrapping and forming the water-blocking sealing layer on the surface of the optical fiber ribbon array and the gap between two adjacent optical fiber ribbons;

after a water-blocking tape wraps the surface of the optical fiber ribbon array wrapped with the water-blocking sealing layer, enabling the optical fiber ribbon array to horizontally enter a mold core of an extrusion head on an extrusion apparatus, wherein the water-blocking assembly comprises the water-blocking sealing layer and the water-blocking tape;

uniformly distributing a plurality of reinforcing elements between a mold sleeve of the extrusion head and the mold core; and extruding the outer protection layer between the mold sleeve and the mold core to form the overhead ribbon cable.

13. The manufacturing method according to claim 12, wherein the wrapping and forming the water-blocking sealing layer on the surface of the optical fiber ribbon array and the gap between two adjacent optical fiber ribbons specifically comprises:

enabling the optical fiber ribbon array to pass through a gluing apparatus, and filling and wrapping the surface of the optical fiber ribbon array and filling the gap between the two adjacent optical fiber ribbons with the sealant by the gluing apparatus; and enabling the optical fiber ribbon array wrapped with the sealant to pass through a heating apparatus, and curing the sealant in the heating apparatus to form the water-blocking sealing layer.

14. The manufacturing method according to claim 8, wherein the after the optical fiber ribbon array wrapped with the water-blocking assembly and the outer protection layer is cooled and formed, performing pulling and take-up to form the overhead ribbon cable specifically comprises:

cooling, by a vacuum water tank and a cooling water tank, the optical fiber ribbon array wrapped with the water-blocking assembly and the outer protection layer.

15. A manufacturing system for an overhead ribbon cable, wherein the manufacturing system is applied to the overhead ribbon cable according to claim 1, the manufacturing system comprises a pay-off unit configured to form the optical fiber ribbon array, wherein an output end of the pay-off unit is sequentially connected to a gluing apparatus, a heating apparatus, an extrusion apparatus, and a cooling apparatus, and the optical fiber ribbon array sequentially passes through the pay-off unit, the gluing apparatus, the heating apparatus, and the extrusion apparatus at a same height.

16. The manufacturing system according to claim 15, wherein the cooling apparatus comprises a vacuum water tank and a cooling water tank which are sequentially connected with an output end of the extrusion apparatus.

* * * * *